US010268830B2

(12) United States Patent
Libin (10) Patent No.: US 10,268,830 B2
(45) Date of Patent: *Apr. 23, 2019

(54) AUTOMATIC PROTECTION OF PARTIAL DOCUMENT CONTENT

(71) Applicant: EVERNOTE CORPORATION, Redwood City, CA (US)

(72) Inventor: Phil Libin, San Jose, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,271

(22) Filed: Jan. 22, 2018

(65) Prior Publication Data
US 2018/0157857 A1    Jun. 7, 2018

Related U.S. Application Data

(63) Continuation of application No. 14/156,777, filed on Jan. 16, 2014, now Pat. No. 9,875,369.

(60) Provisional application No. 61/755,631, filed on Jan. 23, 2013.

(51) Int. Cl.
*G06F 21/62* (2013.01)
(52) U.S. Cl.
CPC ................. *G06F 21/6209* (2013.01)
(58) Field of Classification Search
CPC .................................................. G06F 21/6209
See application file for complete search history.

(56) References Cited

U.S. PATENT DOCUMENTS

| 7,484,107 | B2 | 1/2009 | Forlenza et al. |
| 8,522,050 | B1 | 8/2013 | Wakerley |
| 8,880,597 | B1 | 11/2014 | Pachikov et al. |
| 2003/0212899 | A1 | 11/2003 | Curtis |

(Continued)

OTHER PUBLICATIONS

Libin, Office Action, U.S. Appl. No. 14/156,777, dated Feb. 24, 2015, 12 pgs.

(Continued)

*Primary Examiner* — Kambiz Zand
*Assistant Examiner* — Thanh H Le
(74) *Attorney, Agent, or Firm* — Morgan, Lewis & Bockius LLP (57) ABSTRACT

Protecting a fragment of a document includes automatically detecting the fragment without user intervention based on the content of the fragment and/or the context of the fragment within a set of documents, selectively encrypting the fragment to prevent unauthorized access, and providing an alternative view of the fragment that prevents viewing and access of content corresponding to the fragment unless a decryption password is provided. Automatically detecting the fragment may include detecting numbers and alphanumeric sequences of sufficient length that do not represent commonly known abbreviations, detecting generic terms, detecting proper names, detecting terms signifying a type of content, detecting mutual location of terms and sensitive content, and/or detecting user defined terms. The generic terms may correspond to password, passcode, credentials, user name, account, ID, login, confidential, and/or sensitive. The proper names may be names of financial organizations and security organizations.

20 Claims, 11 Drawing Sheets

(56) References Cited

U.S. PATENT DOCUMENTS

| | | |
|---|---|---|
| 2006/0075228 A1 | 4/2006 | Black et al. |
| 2011/0119576 A1* | 5/2011 | Aumann ............. G06F 17/2282 |
| | | 715/255 |
| 2011/0239113 A1 | 9/2011 | Hung et al. |
| 2012/0151553 A1 | 6/2012 | Burgess et al. |
| 2012/0233671 A1 | 9/2012 | Beder et al. |
| 2013/0212463 A1 | 8/2013 | Pachikov et al. |
| 2013/0272523 A1* | 10/2013 | McCorkindale ......... H04N 1/44 |
| | | 380/243 |

OTHER PUBLICATIONS

Libin, Final Office Action, U.S. Appl. No. 14/156,777, dated Aug. 6, 2015, 12 pgs.

Libin, Office Action, U.S. Appl. No. 14/156,777, dated Dec. 16, 2015, 12 pgs.

Libin, Final Office Action, U.S. Appl. No. 14/156,777, dated Jun. 12, 2016, 13 pgs.

Libin, Notice of Allowance, U.S. Appl. No. 14/156,777, dated Sep. 20, 2017, 8 pgs.

* cited by examiner

AUTOMATIC PROTECTION OF PARTIAL DOCUMENT CONTENT

RELATED APPLICATIONS

This application is a continuation of and claims priority to U.S. patent application Ser. No. 14/156,777, filed Jan. 16, 2014, entitled "Automatic Protection of Partial Document Content," which claims priority to U.S. Provisional Application No. 61/755,631, filed Jan. 23, 2013, and entitled "Automatic Protection of Partial Document Content," content of which is incorporated herein by reference in their entireties.

TECHNICAL FIELD

This application is directed to the field of information processing and security, and more particularly to the field of selective encoding of personal information.

BACKGROUND

Personal and enterprise security requirements and preferences impose various limitations on viewing, editing, transmitting and storing documents, notes and other types of information in content management systems. Providing flexible, secure and user-friendly methods of content protection is especially important for multi-platform content management systems, such as the Evernote service and software developed by the Evernote Corporation of Redwood City, Calif. These systems may be cloud centered, accessible from multiple client devices and may contain highly diversified content with different security and content protection needs for different documents. The need in such protection methods is magnified by widespread privacy and security concerns related to highly publicized and malicious hacker attacks targeting personal information and content.

Protection levels for sensitive information may significantly vary depending on an organization, task and type of information. Still, generally, increasing the security and protection of information increases overhead for maintaining, discovering, accessing and modifying the information. For example, utilizing hardware-based full disk encryption with as a Trusted Platform Module (TPM) elevates the risk of data loss in case of a broken TPM unit, which may create a single point of failure in the encryption chain. To minimize such risks, additional solutions may be deployed, including methods for creation, storage and management of recovery keys.

Similar problems are associated with an access to protected information: the more documents and other content are stored in encrypted formats, the more challenging it becomes accessing and searching the documents. Thus, industrial cryptographic solutions that don't allow searching within multiple units of encrypted content create a content discovery problem in large content collections. Notwithstanding substantial amounts of an academic work on search in encrypted information, including methods of searchable symmetric and public encryption and secure indexes, the results of such research lack applicability in many practical areas, including search efficiency. Consequently, production systems with searchable encrypted data have not been deployed on a broad scale. It should also be noted that even if the encrypted data were searchable, the content of retrieved documents would still be hidden from a user's view until decrypted. Subsequently, visual document selection and scanning, which are central for the current search paradigm, may be impossible or at least very impractical without decryption, adding another level of complexity to fully encrypted storage and retrieval of documents.

Evernote service and software offers a combined approach to protection of and search in private content collections based on partial protection of content in its notes. It includes selective encryption of user-defined portions of notes, as described in U.S. patent application Ser. No. 10/936,193 titled: "ELECTRONIC NOTE MANAGEMENT SYSTEM AND USER-INTERFACE", filed on Sep. 7, 2004 by Pachikov, et al. and incorporated by reference herein. A user may select and password-encrypt one or more contiguous portions of note text which the user considers sensitive; encrypted content is replaced by rows of asterisks with a lock icon and is stored and transmitted in the encrypted form at every level of the cloud service and its client software where the note appears after synchronization. Such protected content may be permanently decrypted or temporarily displayed in response to user selection of an encrypted fragment and the user entering a corresponding password which may change from portion to portion. The rest of the note content remains open and visible and facilitates search and visual selection.

Notwithstanding significant benefits, this partial protection method requires a significant amount of manual work. The user has to visually identify, select and encrypt every contiguous piece of sensitive content, which increases a risk of overlooking and leaving unprotected pieces of sensitive information, especially in long documents.

Accordingly, it is desirable to provide a mechanism for automatic or semi-automatic protection of partial document content for content management systems.

SUMMARY

According to the system described herein, protecting a fragment of a document includes automatically detecting the fragment without user intervention based on the content of the fragment and/or the context of the fragment within a set of documents, selectively encrypting the fragment to prevent unauthorized access, and providing an alternative view of the fragment that prevents viewing and access of content corresponding to the fragment unless a decryption password is provided. Automatically detecting the fragment may include detecting numbers and alphanumeric sequences of sufficient length that do not represent commonly known abbreviations, detecting generic terms, detecting proper names, detecting terms signifying a type of content, detecting mutual location of terms and sensitive content, and/or detecting user defined terms. The generic terms may correspond to password, passcode, credentials, user name, account, ID, login, confidential, and/or sensitive. The proper names may be names of financial organizations and security organizations. Terms signifying a type of content may correspond to formula, figure, and/or chart. In response to a term indicating an image, the image following the term may be detected. Selectively encrypting may include deciding whether to encrypt at least a portion of the fragment and may include encrypting content in addition to the fragment. Providing alternative views may include providing an obfuscated view of the fragment that retains an original size and shape of the fragment. The obfuscated view may be blurred, pixelated, filled with a solid color, filled with a regular geometric pattern, and/or filled with an irregular geometric pattern. Providing alternative views may include providing a collapsed view of the fragment that replaces content corresponding to the fragment with one or more characters.

Providing alternative views may include providing a hidden view of the fragment where the fragment is removed from a corresponding document. The documents may be notes in content management system. The content management system may be cloud based and may share content across different devices of a user. The content management system may be the OneNote® note-taking software provided by the Microsoft Corporation of Redmond, Wash. The alternative views may be provided on a mobile device. The mobile device may be a tablet using an operating system selected from the group consisting of: iOS, Android OS, Windows Phone OS, Blackberry OS and mobile versions of Linux OS.

According further to the system described herein, computer software, provided in a non-transitory computer-readable medium, protects a fragment of a document. The software includes executable code that automatically detects the fragment without user intervention based on the content of the fragment and/or the context of the fragment within a set of documents, executable code that selectively encrypts the fragment to prevent unauthorized access, and executable code that provides an alternative view of the fragment that prevents viewing and access of content corresponding to the fragment unless a decryption password is provided. Executable code that automatically detects the fragment may detect numbers and alphanumeric sequences of sufficient length that do not represent commonly known abbreviations, generic terms, proper names, terms signifying a type of content, mutual location of terms and sensitive content, and/or user defined terms. The generic terms may correspond to password, passcode, credentials, user name, account, ID, login, confidential, and/or sensitive. The proper names may be names of financial organizations and security organizations. Terms signifying a type of content may correspond to formula, figure, and/or chart. In response to a term indicating an image, the image following the term may be detected. Executable code that selectively encrypts may include executable code that allows a user to decide whether to encrypt at least a portion of the fragment. Executable code that selectively encrypts may include executable code that allows a user to encrypt content in addition to the fragment. Executable code that provides alternative views may provide an obfuscated view of the fragment that retains an original size and shape of the fragment. The obfuscated view may be blurred, pixelated, filled with a solid color, filled with a regular geometric pattern, and/or filled with an irregular geometric pattern. Executable code that provides alternative views may provide a collapsed view of the fragment that replaces content corresponding to the fragment with one or more characters. Executable code that provides alternative views may provide a hidden view of the fragment wherein the fragment is removed from a corresponding document. The documents may be notes in content management system. The content management system may be cloud based and may share content across different devices of a user. The content management system may be the OneNote® note-taking software provided by the Microsoft Corporation of Redmond, Wash. Alternative views may be provided on a mobile device. The mobile device may be a tablet using an operating system selected from the group consisting of: iOS, Android OS, Windows Phone OS, Blackberry OS and mobile versions of Linux OS.

The proposed method and system automatically detect sensitive portions of a document, encrypt the sensitive portions automatically or following user approval and, possibly, editing, and present encrypted portions in various formats where encrypted portions may have different levels of visibility or may be completely hidden from reader's view, may have associated single or multiple passwords and may be decrypted or temporarily displayed in response to entering decryption passwords. As explained in more detail elsewhere herein, sensitive portions may be automatically detected without user intervention based on the content of the portions and the context of the portions within the set of documents.

The detection process starts when a user instructs the system to protect selected content, for example, by pressing a partial encryption button in the software. The selected content may be a document or a note, a batch of selected documents/notes, a logical container, such as a file folder or an Evernote notebook, or a set of such containers. The system may scan the selected set, document by document, analyze each document and split the document into safe (open) and sensitive (intended for protection) portions based on lexical, syntactic and semantic properties of each of the content units, as explained elsewhere herein. In an embodiment, a user may instruct the system to automatically analyze each new or existing document in available content collections or may define automatic rules by which the system may decide which content units are to be analyzed. For example, a rule may be prescribed to analyze all scanned documents filed into a certain project notebook or every document initiated as an email received from a certain person or a group of people. Such rules and instructions may reduce the amount of manual work required to pre-select documents for subsequent analysis by the system.

There may be several layers of sensitive content in a document corresponding to different sensitivity definitions and ranges of system confidence scores assigned to each layer. The system may highlight detected fragments of sensitive content by layers and presents the detected fragments to the user within a simple interface allowing the user to accept (approve), decline or edit sensitive information in each layer, add some of the safe terms to the encrypted portion at user discretion, and store additional terms and rules for detecting sensitive content in the system settings and datasets. Additionally, the user may define one or several display formats for protected fragments of information, assign one or multiple decryption passwords, control various workflow options, etc.

After the user finishes reviewing and editing information presented by the system and approved the results, the system may automatically encrypt and hide the approved sensitive content from view and offer the user an opportunity to assign one or multiple passwords for decrypting hidden portions of the content; the system may also use a session-wide password to simplify protection of multiple selected documents and memorizing the passwords. The system may also, either on its own or in connection with other components, automatically generate a password that optionally may be used across different devices of the user.

Protected content may be displayed in a variety of formats, subject to user choice, sensitivity levels and other factors. Several options for content view are listed below in an order from less protected to more protected:

Obfuscated view, which retains an original size and layout of protected portion(s) of the document and hides sensitive information by blurring, pixelating or otherwise obstructing viewing of the content. Looking at such a document, a user and possibly other readers may clearly see locations, layouts and sizes of protected fragments of information.

Collapsed view where sensitive content may be replaced by rows of one or more characters, such as asterisks, with protection icons displayed within the document.

Such view retains hints about the location of protected fragments but not the size or layout of each protected fragment.

Completely hidden from view, so the document is presented with content omissions and even the location and existence of protected portions may be unknown to third parties. The completely hidden view may use additional indications that hidden portions are present in a document and additional tools for content decryption, as explained elsewhere herein.

A process of detection of sensitive portions of document content may use, but is not limited to, the following heuristic and analytic methods and system data:

A. Numbers and alphanumeric sequences of sufficient length (for example, all sequences longer than three characters) that do not represent commonly known abbreviations may be deemed sensitive content.

B. Grammatically correct phrases that contain only words from a common dictionary or user additions to the dictionary (as permitted by some spell-checkers or other dictionary applications) may be deemed safe (not sensitive) content.

C. A dictionary of content sensitivity hints may be compiled from different sources, for example:
  1. Generic terms associated with information security, such as "password", "passcode", "credentials", "user name", "account", "ID" "login", "confidential", "sensitive", etc. Common abbreviations of these terms may also be included; custom abbreviations or synonyms may be added by the user. Of course, corresponding terms in other languages may be used.
  2. Proper names associated with sensitive content, such as names of banks, financial organizations, security organizations and similar terms.
  3. Terms signifying special types of content, such as "formula", "figure", "chart", etc.
  4. Custom terms added by a user, such as personal names, internal project names, and other terms and keywords hinting at potentially sensitive content.
  5. Specific sensitive terms that are subject to encryption every time they appear in the text, such as sensitive project or technical names or denotations, milestone dates, schedules, events, etc.

Subsequently, if sensitivity hints from the dictionary appear in a document, the system may process the hints using different routines. For example, a specific sensitive term may be immediately treated as a protected portion of content while a generic term associated with information security, such as "password", may cause the system to look for a short separate line of text which does not form a grammatically correct sentence and starts with the generic term. In some cases, the sensitivity hint may be included in the safe content (to facilitate future searches), while the rest of the line may be included in the sensitive content to address a habitual format of presenting credentials in the text, such as "user name: xxxxx" or "password: xxxxx", placed on separate lines of text. Similarly, a sensitivity hint "formula" or "figure", potentially combined with other location defining words, such as "as follows", "below", "above" may cause the system to look for embedded images or, in case of rich document formats, to special data formats, such as embedded formulas, and mark such images or formulas as sensitive content fragments.

In addition to sensitivity hints found explicitly in the document text, other techniques such as image, text, handwriting, shape, formula, voice, music and other recognition technologies may be used for analyzing multimedia content of documents. Thus, portions of content recognized as mathematical or chemical formulas, charts, technical drawings, specific spoken words in an audio clip, etc. may be included in the sensitive content and obfuscated, garbled or otherwise protected from an unauthorized access.

Users may customize rules for content categorization; for example, if a majority of documents in a user notebook represent published mathematical articles with accompanying texts or textual comments by reviewers, then the user may decide to exclude the formulas (published matter) from detection options for sensitive content and to delete terms such as "formula", "equation" and similar from a runtime dictionary of context sensitivity hints.

A user interface (UI) for a detection and approval process may be static or dynamic: the system may present results of document analysis after the system finishes processing of a current document, finishes all selected documents or finishes all designated documents when manual selection by the user is absent. The system may illustrate the process and results of detecting sensitive content using visual and audio markers to emphasize discovered sensitive terms. For example, a traffic light metaphor may be applied to the document sensitivity markup where safe content, the most sensitive content and a gray area in-between are marked correspondingly by green, red and yellow highlighting, font, comments or other similar techniques. The system may also attract user attention to different sizes of detected sensitive content using on-screen messages, audio warning signals, etc.

Reporting and approval sections of the user interface may include buttons for acceptance, rejection or editing of each discovered sensitive portion of the content, as well as for adding sensitive terms and portions of the document left unnoticed by the system. The user interface may also include viewing format options for protected fragments and password management sections for protected content, as explained elsewhere herein. In some embodiments, the system may automatically encrypt and choose a display format for protected content, which limits user involvement to defining passwords for future access to protected content. For some embodiments, protection passwords may also be generated automatically and entered, with user approval, into user's separate password management system which may also propagate the automatically-generated password(s) across different user devices (e.g., laptop, desktop, tablet, smartphone, etc.).

Decryption of protected portions of content may be initiated by clicking on an obfuscated, collapsed or otherwise garbled portion of content in a document, which may cause displaying a password pop up form. In cases where part or all protected content is completely hidden from view, an icon or button indicating the presence of hidden content may be added to a toolbar or to a document containing the hidden content; clicking on the button may also initiate a password entry form and subsequently display the hidden content within the document.

In some embodiments, permanent encryption of protected fragments may differ from temporary display of the protected fragments for one-time access. As an example, in Evernote, temporarily displayed protected portions of a note are collapsed back after access by a reader when another note is selected and the partially encrypted note loses navigation focus.

BRIEF DESCRIPTION OF THE DRAWINGS

Embodiments of the system described herein will now be explained in more detail in accordance with the figures of the drawings, which are briefly described as follows.

DETAILED DESCRIPTION

The system described herein provides a new mechanism for an automatic or semi-automatic partial protection of user content, which may include: detecting sensitive content in one or multiple documents, notes and other content units; categorizing content by degree of sensitivity; highlighting sensitive portions of content and offering the sensitive portions for user approval and optional editing; requesting from a user or generating passwords; selecting display formats; encrypting and garbling protected portions of content; and decrypting protected content on request, after successful verification of decryption credentials.

Figure 1:
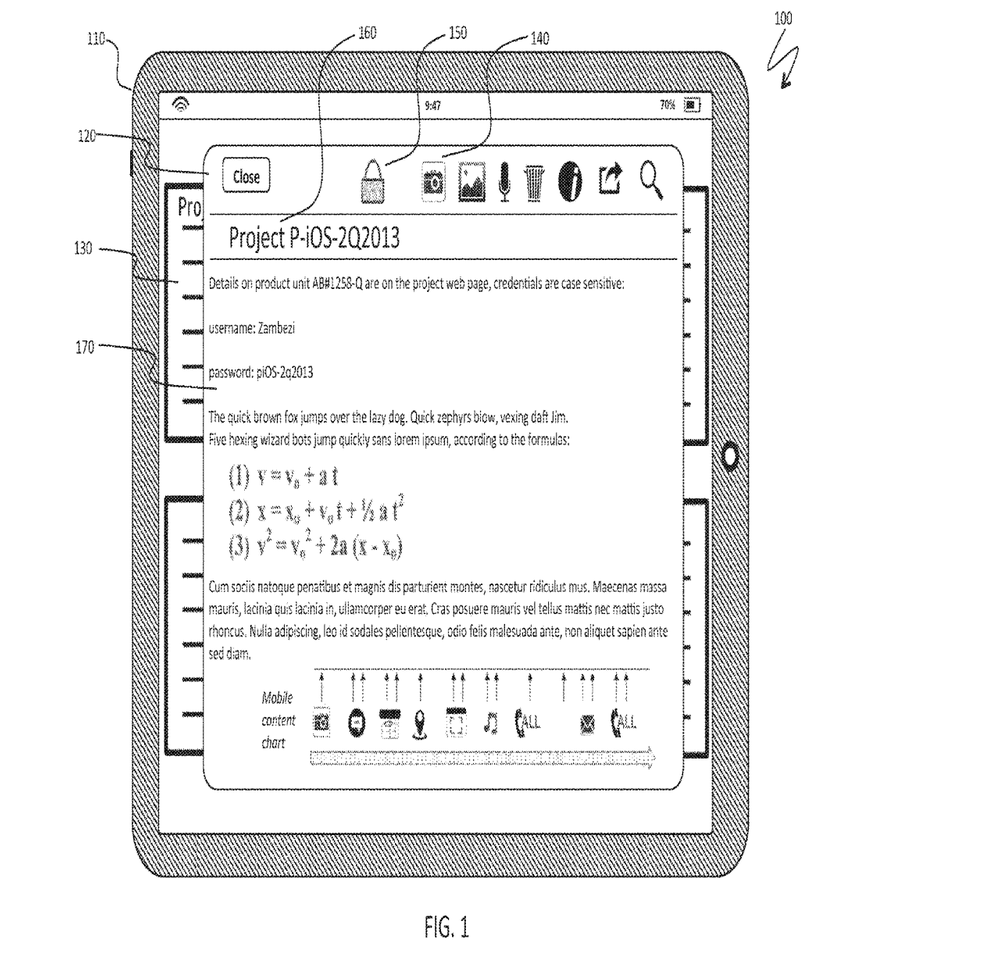
FIG. 1 is a schematic illustration of an original fully displayed note in a content management system, according to embodiments of the system described herein.

FIG. 1 is a schematic illustration 100 of an original fully displayed note in a content management system, an input to the system described herein. A mobile device 110 displays a note 120 opened from a thumbnail 130. A user interface of a software application associated with the content management system and maintaining the note includes a general toolbar 140 and a dedicated protection button 150; pressing the button 150 initiates a system selection and encryption process for selected or otherwise defined notes, as explained elsewhere herein. The note 120 has a title 160 and a body 170; either or both the title 160 and the body 170 may be subject to partial protection (encryption) of content. The note 120 indicates that a project identifier in the title 160 and several portions of the body 170 of the note 120 may represent sensitive information and may be subject to partial protection. A simple set of formulas from basic mechanics describing trajectory of an object is presented in the illustration 100 for illustration purposes and is intended to be a placeholder for more complex and potentially sensitive formulas that may need protection from occasional reading by a third party who may be authorized to view the note without necessarily being authorized to access to all of the content of the note 120. In some cases, only select readers may fully access the note 120 or portions thereof.

Figure 2:
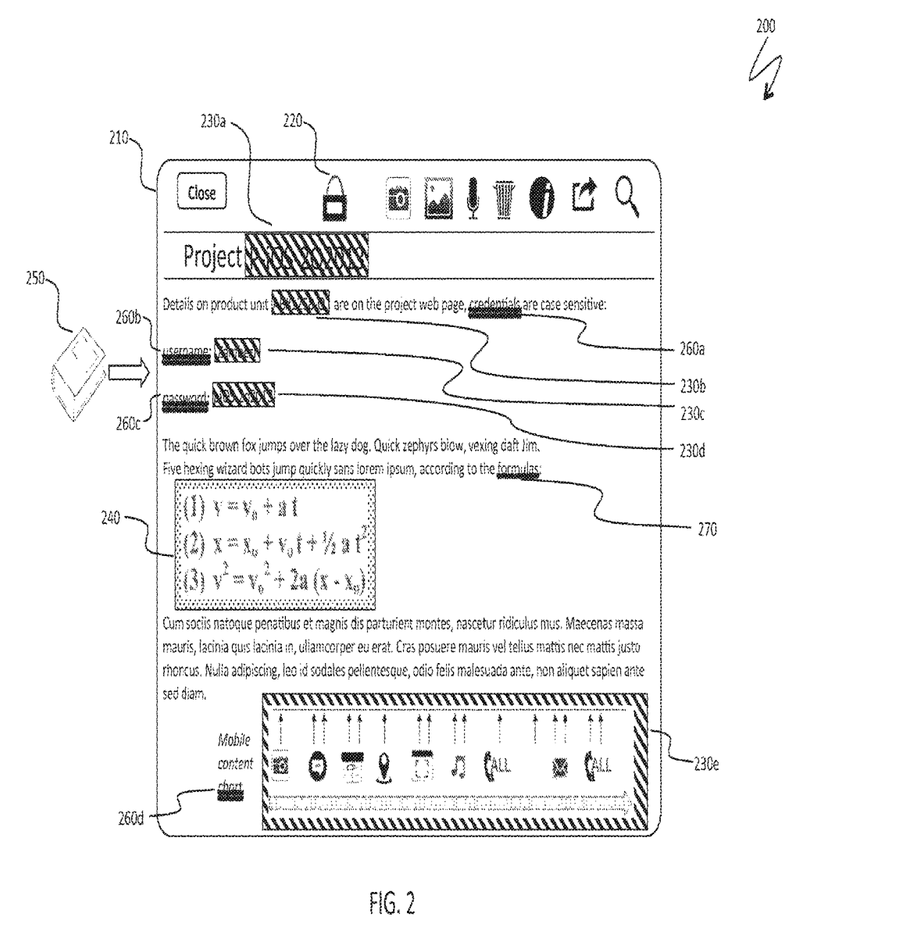
FIG. 2 is a schematic illustration of a pre-processed note with visual markup of potentially sensitive portions of content of the note, according to embodiments of the system described herein.

FIG. 2 is a schematic illustration 200 of a pre-processed note 210 with visual markup of potentially sensitive portions of content of the note 210. The note 210 has a content protection button 220 in a toolbar of the note 210 in an active position and reflects a status at an end of pre-processing, so marked up results are shown in a title of the note 210 and a body of the note 210. There are two sensitivity layers in the illustration 200: a red layer of maximum sensitivity is indicated by a bold diagonal pattern, while a medium yellow layer is shown by a dotted pattern. In the example, of the illustration 200, six sensitive content fragments are detected and are marked up and suggested for protection: five red fragments 230 a-230 e and a yellow fragment 240. The highly sensitive fragments represent a project code (the fragment 230 a) and a product unit code (the fragment 230 b), a username (the fragment 230 c), and a password for accessing project web page (the fragment 230 d), and a chart (the fragment 230 e). The medium sensitivity fragment 240 corresponds to a set of formulas.

Detection of sensitive fragments in the illustration 200 is performed by the system according to the mechanism(s) described elsewhere herein. In particular, the fragments 230 a, 230 b are detected as alphanumeric sequences of sufficient length that do not represent commonly known abbreviations. Other sensitive content is associated with content sensitivity hints from the dictionary 250. Thus, sensitive terms "credentials", "username" and "password" 260 a, 260 b, 260 c, combined with a traditional layout of the username and password lines, lead to detection of the fragments 230 c, 230 d, while a term "chart" (corresponding to the fragment 260 d), which, in this particular dictionary, is a hint of a highly sensitive content, combined with an embedded image corresponding to the fragment 230 e and immediately following the term "chart", denote the image corresponding to the fragment 230 e as a potentially highly sensitive portion of content. Similarly, a medium sensitivity hint "formulas" 270, neighboring an embedded image or a portion of note authored in a math format, lead to marking up the formula set corresponding to the fragment 240 as a yellow fragment.

Figure 3A:
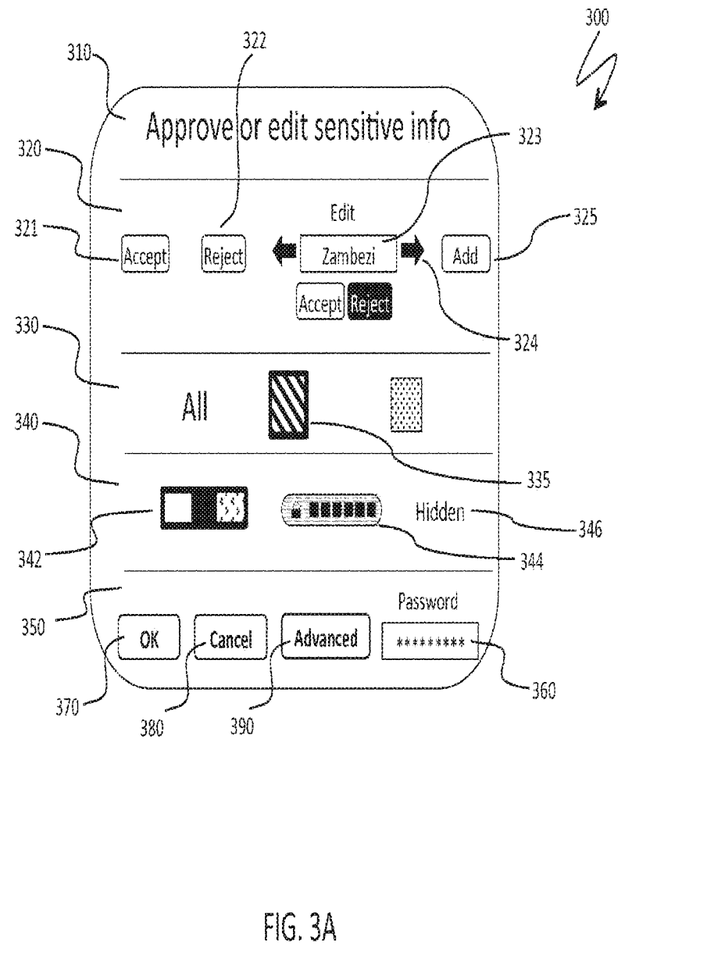
FIGS. 3A and 3B are schematic illustrations of a partial protection user interface for approval and editing of sensitive information and for customizing system settings, according to embodiments of the system described herein.

FIG. 3A is a schematic illustration 300 of a partial protection user interface for approval and editing of identified sensitive information and for customizing system settings. A pane 310 may be displayed to a user after the system has completed detection of sensitive content for a most recent batch of notes or documents, provided that user review and approval are needed. In the illustration 300, a user interface pane 310 consists of four sections: an approval and editing section 320, a sensitivity layer section 330, a display format section 340, and a password and general section 350.

The approval and editing section 320 includes group approval buttons 321, 322 for acceptance and rejection, which accept or reject all sensitivity items of the currently selected sensitivity layer in the section 330. The buttons 321, 322 may also accept or reject suggested protection fragments altogether if, instead of a specific sensitivity layer, all layers are chosen in the section 330. For more granular editing and acceptance, a scrollable list 323 navigated by arrows 324 may be used; the list 323 shows sensitive fragments word by word, and a user may individually accept or reject each word. In the illustration 300, the user rejects a username "Zambezi", deleting the user name from the list 323, which is further described in connection with FIGS. 4-6. The user may also explicitly add terms and other portions of a note that have not otherwise been suggested by using a button 325, which opens a note editing interface with an ability to select and designate sensitivity layers to additional portions of content (not shown in FIG. 3A).

The sensitivity layer section 330 includes three items, corresponding to a two-layer implementation of the illustration 300, namely, a currently selected red layer 335 (selections are shown in FIG. 3A as bold black frames), for which the user edits and approves system suggestions, a similar item for a yellow layer, and an All setting that allows merging editing and approval processes for separate layers.

Figure 4:
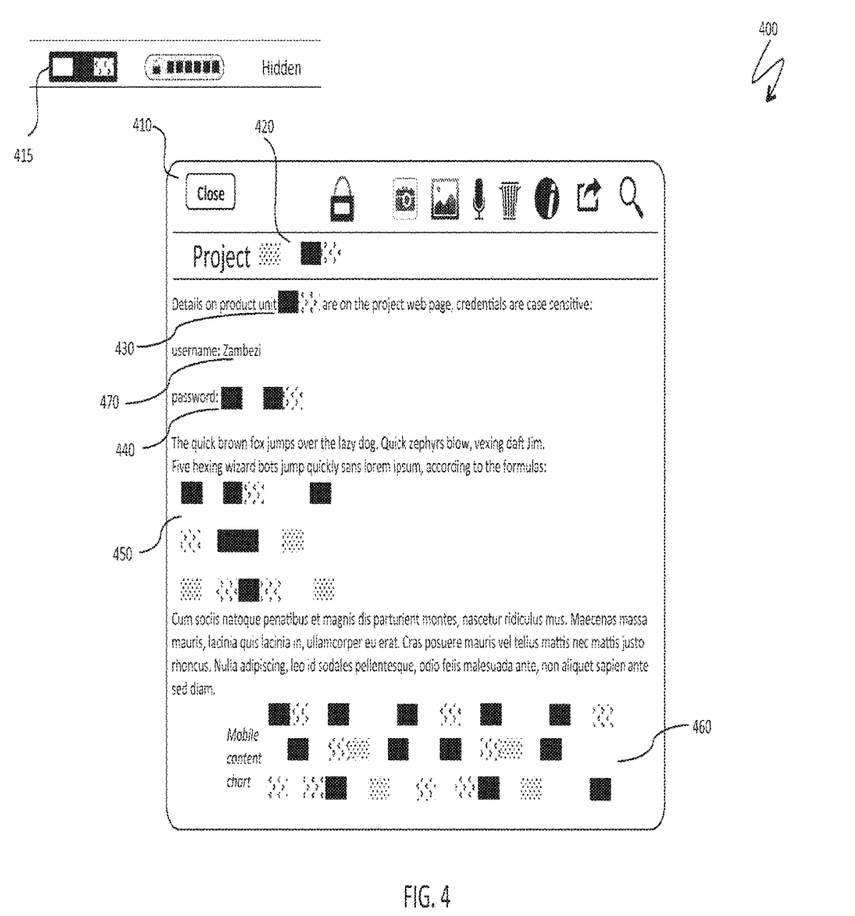
FIG. 4 is a schematic illustration of a partially protected note with an obfuscated sensitive content, according to embodiments of the system described herein.
Figure 5:
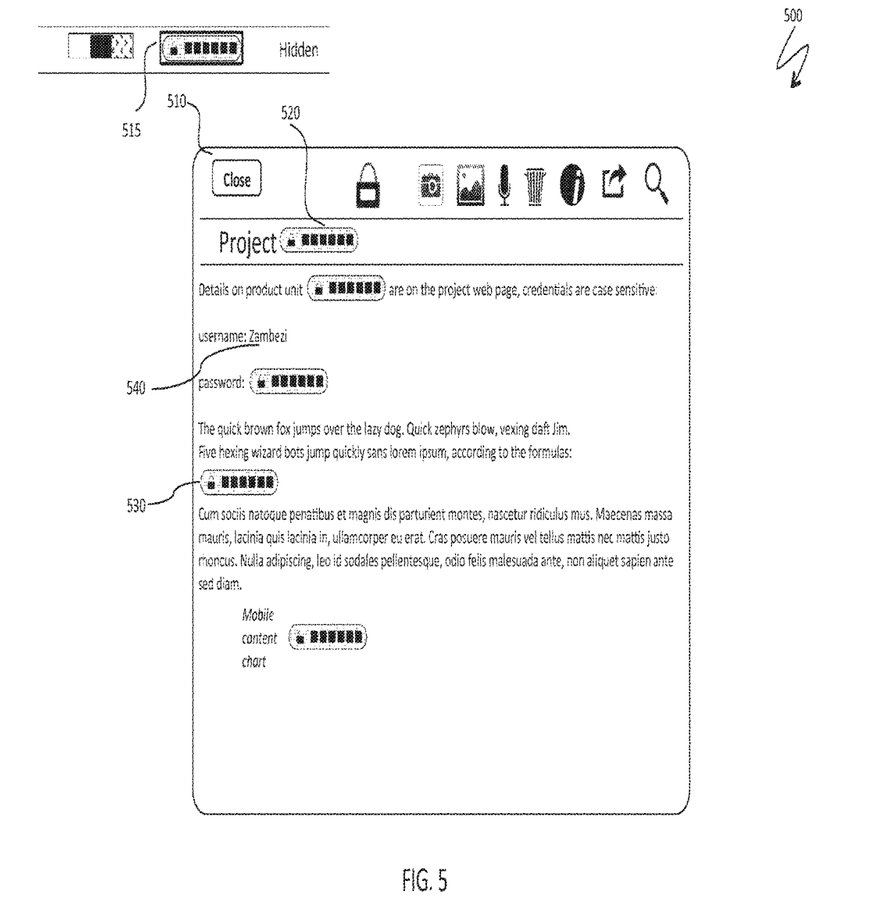
FIG. 5 is a schematic illustration of a partially protected note with a collapsed sensitive content, according to embodiments of the system described herein.
Figure 6:
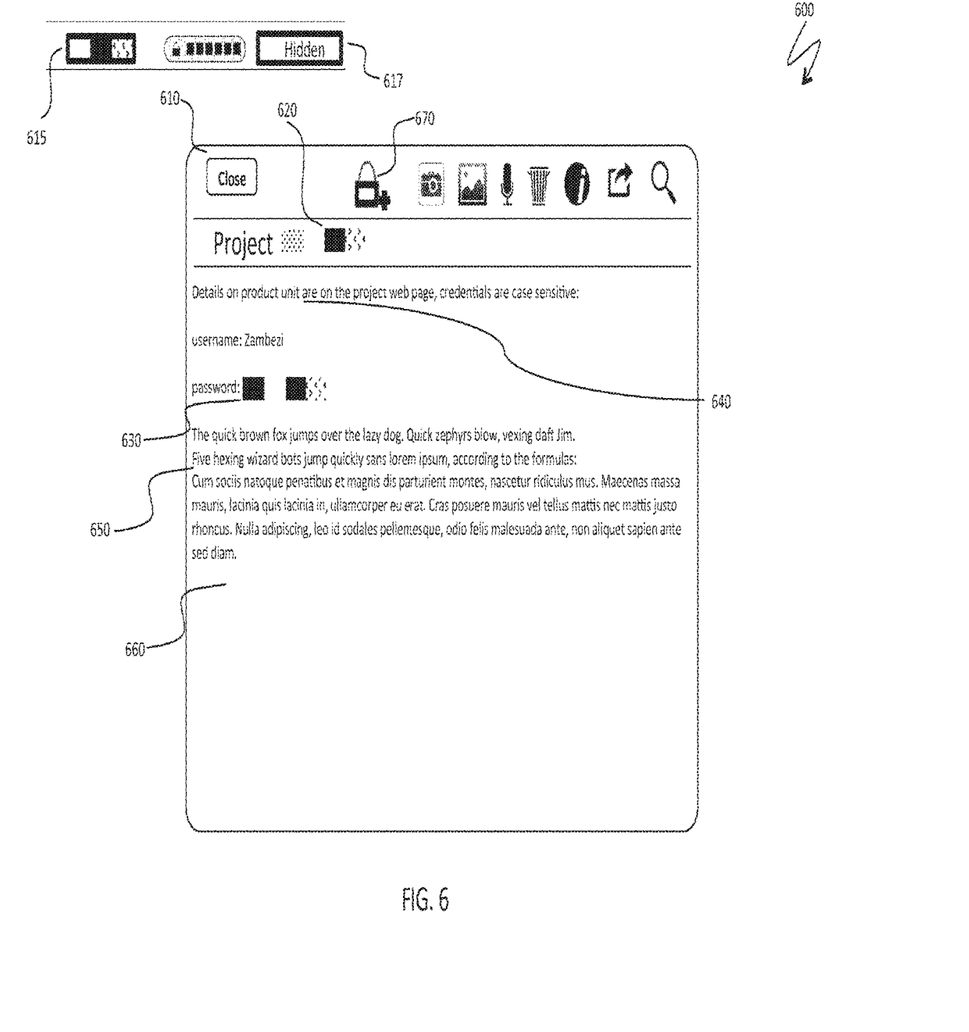
FIG. 6 is a schematic illustration of a partially protected note with a mix of obfuscated and hidden sensitive content, according to embodiments of the system described herein.

The display format section 340 includes three options for displaying garbled sensitive information: obfuscated view 342, collapsed view 344, and hidden view 346, which are illustrated in more details in FIGS. 4-6.

The password and general section 350 includes a password field 360 and buttons 370, 380, 390 for closing a pane 310 after accepting changes, canceling all changes and calling advanced settings. Whenever a user accepts a sensitive fragment, the sensitive fragment is assigned a decryption and access password currently present in the field 360; the password is required for decryption and visualizing the original content. The user may keep one and the same password for all fragments or may define different passwords for different fragments of sensitive information. In some cases, discussed in more detail elsewhere herein, the system automatically generates a password. The button 390 may invoke advanced functionality including a systems settings interface (not shown in FIG. 3A) where the user may update a dictionary of sensitivity hints or other aspects of the system functioning.

Figure 3B:
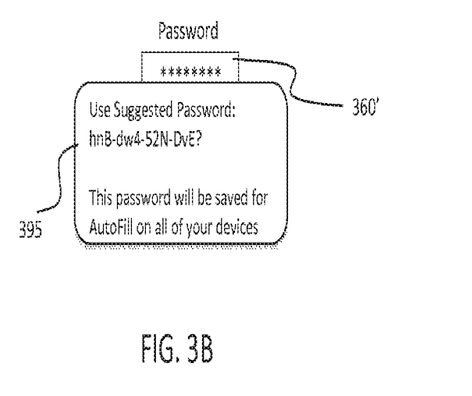

FIG. 3B is a schematic illustration 300' of a modified password field 360' which accepts automatically-generated passwords. A user is prompted by a popup 395 to use an automatically generated password. The user may accept by pressing an Enter key on the keyboard or performing a similar function. In an embodiment herein, the automatically-generated password may be propagated by the system to other devices of the user.

FIG. 4 is a schematic illustration 400 of a partially protected note with an obfuscated sensitive content. The system displays sensitive information, detected by the system and subsequently edited and approved by a user, in a note pane 410 according to the user choice of an obfuscated display format 415 (see description of the section 340 in FIG. 3A for more details). An obfuscated format is the most graceful of the three display formats for partially protected content explained herein: the obfuscated format retains layout, size and position of each protected fragment and draws blurred or other patterns or images in the place of original fragments to prevent viewing the original fragments by unauthorized individuals. In the illustration 400, protected line fragments 420, 430 and 440 represent separate sensitive words obfuscated without reformatting the note pane 410. Similarly, area fragments 450, 460 representing, respectively, formulas and a chart, are obfuscated without changing a layout of the fragments 450, 460 or a size or location of the fragments 450, 460. In addition, a suggested sensitive fragment 470 that was rejected by a user (see item 323 in FIG. 3A) is displayed as a safe content item (i.e., in plain text).

FIG. 5 is a schematic illustration of a partially protected note with a collapsed sensitive content. The system displays suggested sensitive information, subject to editing and approval by a user, in a note pane 510 using a collapsed display 515. A collapsed display format is a broadly accepted format for different types of encrypted information: the collapsed display format retains placeholders, (e.g., of standard height and width) and provides encryption bar icons, marking only protected places in a document so the protected places can be decrypted individually. Thus, a line fragment 520 and an area fragment 530 have generally the same display pattern. For a new viewer, it may not be obvious how much space each protected fragment occupies in a title or a body of a note. A fragment 540 is similar to an originally suggested fragment being left unprotected, such as the fragment 470 shown in FIG. 4, described above.

FIG. 6 is a schematic illustration of a partially protected note with a mix of obfuscated and hidden sensitive content. A note pane 610 includes a user choice of both obfuscated and hidden display formats 615, 617, along with specific designations which protected fragments are displayed in each format. Thus, a project code 620 in a title of the note pane 610 and a project web page password 630 are obfuscated and therefore retain hints regarding location and size of corresponding fragments, while a product unit code 640, a formula area 650 and a chart 660 with accompanying text are completely hidden. An uninformed user may not even recognize at a glance whether hidden protected fragments have ever existed in a particular note. However, an altered appearance of a protection button 670 may notify the user about presence of hidden content and allow decryption and access of the hidden content if the user knows the decryption password.

It should be noted that a user may choose any combination of display formats for different protected portions of content in any note or document.

Figure 7A:
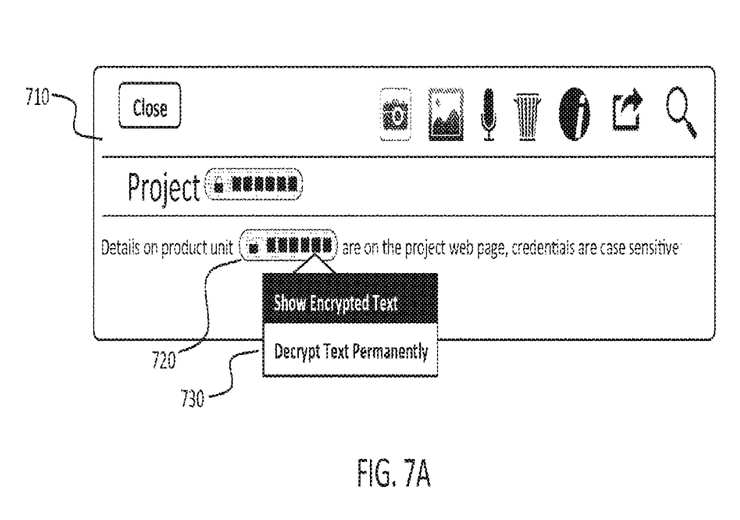
FIGS. 7A-7C are schematic illustrations of a decryption process and user interface for a protected portion of content, according to embodiments of the system described herein.
Figure 7B:
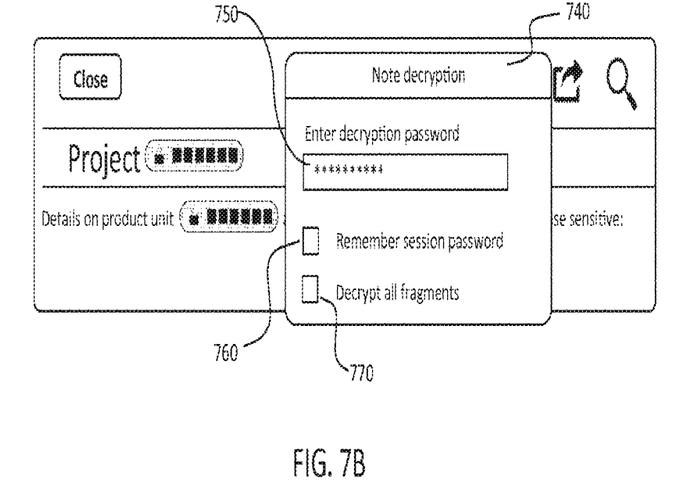
Figure 7C:
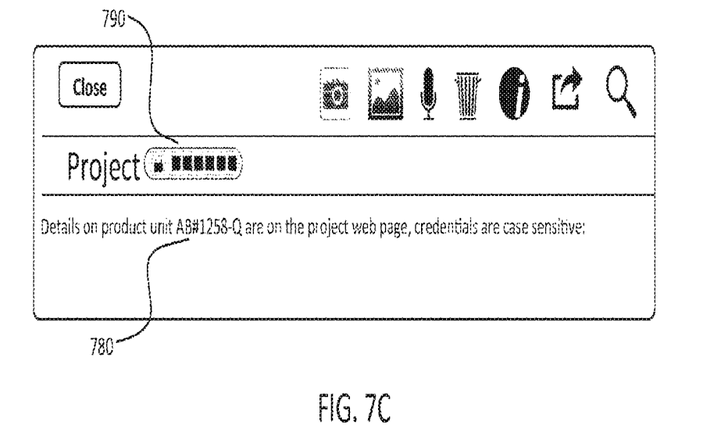

FIGS. 7A-7C are a schematic illustration of a decryption mechanism and a corresponding user interface for a protected portion of content. FIGS. 7A-7C illustrate a situation where a user desires to temporarily decrypt a specific protected portion of a note 710 for viewing without permanently decrypting the specific portion. Upon clicking (or right-clicking or similar) on a desired protected fragment 720, the user receives a pop-up menu 730 with two decryption options. After choosing an option "Show Encrypted Text" the user is presented with a decryption pane 740. The pane 740 has a password field 750 and two checkboxes 760, 770. The checkbox 760 is included to optionally remember a session password so that the session password may be applied to all encrypted fragments until the user quits the software; all protected fragments that are encrypted using the session password will be shown (or permanently decrypted if another option in the menu 730 was chosen) without displaying the pane 740 each time. Another checkbox 770 controls an option to further facilitate displaying or decryption of the content; the option causes all protected fragments in a note or a collection of notes that have the decryption password to be shown all at once provided the user enters the password. In FIG. 7B, both of the checkboxes 760, 770 are unchecked, so, upon entering the decryption password and pressing Enter, an activated protected fragment 780 will be displayed unencrypted (in original form), while a protected fragment 790 remains collapsed even if the protected fragment has the same decryption password.

In embodiments that use an automatically generated password, the system may automatically fill in the pane with the correct password if the system determines that an authorized user has logged in to the system.

Figure 8:
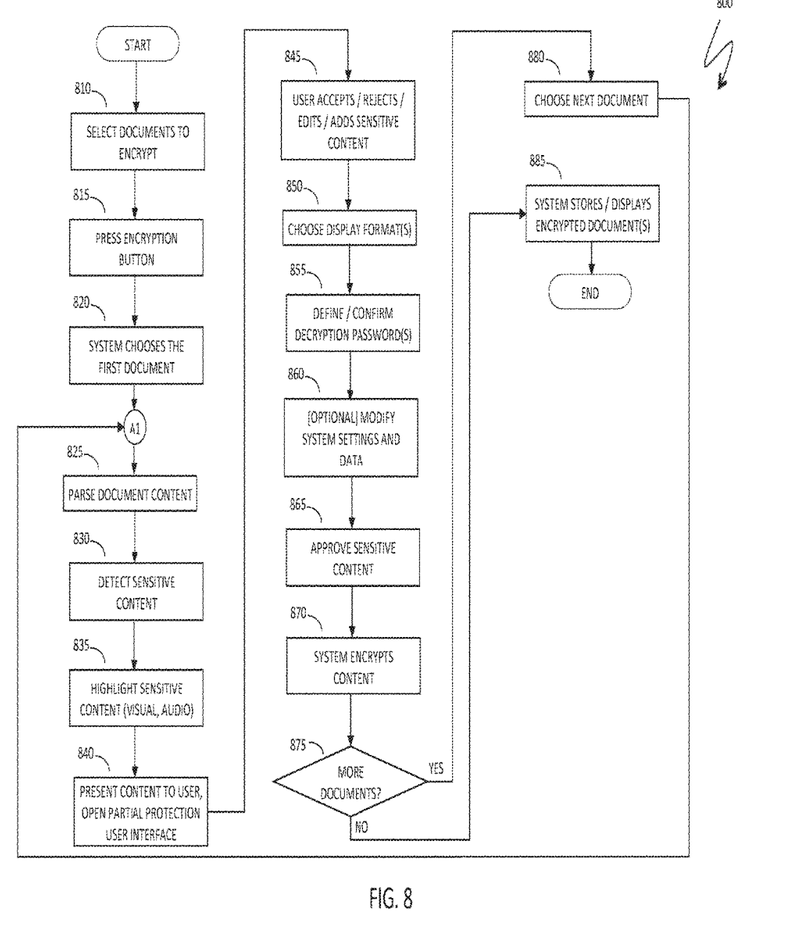
FIG. 8 is a system flow diagram for encrypting content, according to embodiments of the system described herein.

Referring to FIG. 8, a flow diagram 800 illustrates selection and encryption operation of the system according to an embodiment described herein. Processing starts at a step 810 where a user selects documents or notes to encrypt. Note that note selection may be automated, as explained elsewhere herein. After the step 810, processing proceeds to a step 815, where a user presses a protection button (similar to that shown in FIGS. 1, 2, 4-6) or otherwise instructs the system to start content protection. After the step 815, processing proceeds to a step 820, where the system chooses a first document in the selected set. After the step 820, processing proceeds to a step 825 where the system parses document content, as described elsewhere herein.

After the step 825, processing proceeds to a step 830 where the system detects sensitive content of the currently chosen document, as explained elsewhere herein. After the step 830, processing proceeds to a step 835 where the system highlights detected sensitive content using visual, audio and possibly other markup features. After the step 835, processing proceeds to a step 840 where the system presents the highlighted content to the user within the chosen document and within the partial protection user interface (see, for example, FIG. 3 for details of this UI). After the step 840, processing proceeds to a step 845 where the user accepts, rejects, edits and possibly augments the suggested sensitive content of the document. After the step 845, processing proceeds to a step 850 where the user chooses a display format or multiple formats for protected data fragments. After the step 850, processing proceeds to a step 855 where the user defines and confirms a decryption password or multiple passwords for different data fragments (as explained in more details in conjunction with the FIG. 3 and elsewhere herein).

After the step 855, processing proceeds to an optional step 860 where the user may modify system settings and data by opening, for example, a system settings dialog box using the Advanced button in FIG. 3A, described above. After the step 860, processing proceeds to a step 865 where the user approves edits and changes entered by the user and the final composition of the sensitive content, which corresponds to closing the partial protection user interface window using the OK button in FIG. 3A. After the step 865, processing proceeds to a step 870 where the system encrypts the approved protected content within the currently chosen document. After the step 870, processing proceeds to a test step 875 where it is determined whether there are more documents to protect in the document set. If so, processing proceeds to a step 880 where the next document to analyze is chosen. Following the step 880, control transfers back to the step 825, described above, for another iteration. If it is determined at the test step 875 that there are no more documents to protect in the document set, processing proceeds to a step 885 where the system stores partially encrypted documents with information and corresponding display options and additionally encrypted decryption passwords and displays the result to users (original user and/or other individuals) using display formats defined at the step 850. After the step 885, processing is complete.

It should be noted that the system functioning also includes a preliminary process of defining rules and data for detecting sensitive content not shown on FIG. 8.

Figure 9:
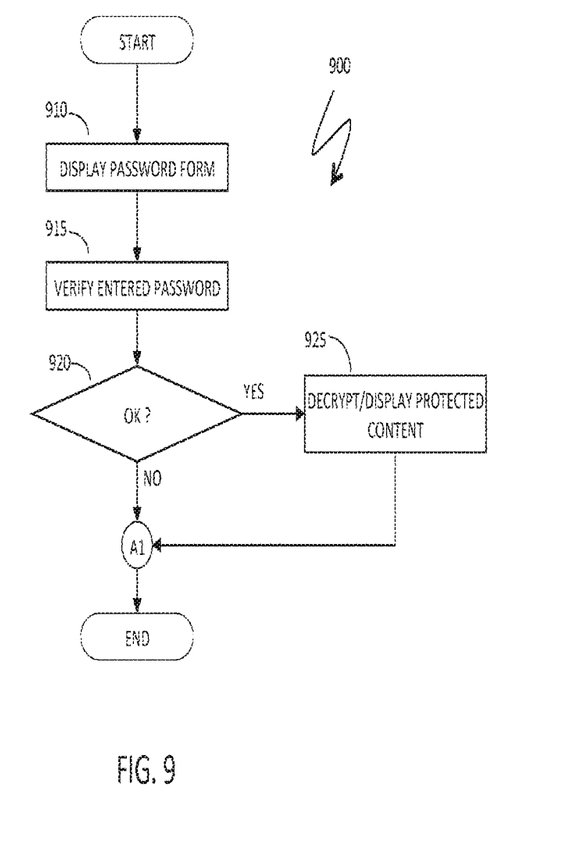
FIG. 9 is a system flow diagram for decrypting content, according to embodiments of the system described herein.

Referring to FIG. 9, a flow diagram 900 illustrates a decryption operation of the system according to an embodiment described herein. Processing begins at a step 910 where a password form is presented to the user and the user enters a decryption password for a chosen protected fragment or a group of fragments, as explained elsewhere herein (see FIG. 7 and accompanying text for details of the decryption process). Note that, optionally, the system may automatically provide an automatically generated password. After the step 910, processing proceeds to a step 915 where the entered password is verified. After the step 915, processing proceeds to a test step 920 where it is determined if the step 915 returned a positive verification. If not, then nothing is decrypted and processing is complete. Otherwise, control transfers from the test step 920 to a step 925 where the system displays or permanently decrypts protected content. After the step 925, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a tablet, a cell phone or a computer, although other devices are also possible.

The system described herein may also be implemented with any personal or corporate private or semi-private content database system, such as the OneNote® note-taking software provided by the Microsoft Corporation of Redmond, Wash. The content database system may or may not be cloud-based and may or may not share content across different devices of a user. The mobile device may include software that is pre-loaded with the device, installed from an app store, installed from a desktop (after possibly being pre-loaded thereon), installed from media such as a CD, DVD, etc., and/or downloaded from a Web site. The mobile device may use an operating system such as iOS, Android OS, Windows Phone OS, Blackberry OS and a mobile versions of Linux OS. In addition to a mobile device, the system described herein may run on any type of processing system, including a desktop or laptop computer and/or a computer that provides mobile device functionality, such as a laptop with a detachable touch sensitive screen.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of protecting a document, comprising:
  automatically detecting a plurality of fragments of the document for possible encryption without user intervention based on at least one of: content of each of the fragments and the context of each of the fragments within the document;
  encrypting a subset of fragments using at least one decryption password required for decrypting and visualizing original content of the subset of fragments;
  enabling a plurality of view options for viewing the subset of fragments;
  in response to receiving a user selection of an alternative view from the plurality of view options, providing the alternative view of the subset of fragments that prevents viewing and access of content corresponding to the subset of fragments; and in accordance with a determination that the at least one decryption password is provided, displaying the subset of fragments without encryption temporarily until another document is selected for display.

2. The method of claim 1, wherein the plurality of view options includes at least an obfuscated view, a collapsed view, and a completely hidden view.

3. The method of claim 2, wherein the obfuscated view is configured to cause at least one of the subset of fragments to retain an original size and shape of the at least one of the subset of fragments.

4. The method of claim 3, wherein the obfuscated view is at least one of: blurred, pixelated, filled with a solid color, filled with a regular geometric pattern, and filled with an irregular geometric pattern.

5. The method of claim 2, wherein the collapsed view is configured to cause at least one of the subset of fragments to replace content corresponding to the at least one of the subset of fragments with one or more characters.

6. The method of claim 2, wherein the hidden view is configured to cause at least one of the subset of fragments to be removed from a display of the document.

7. The method of claim 1, further comprising:
for each of the plurality of detected fragments, enabling display of a partial protection user interface for approving and editing of the respective fragment, wherein the partial protection user interface is configured to select the respective fragment for encryption, display the plurality of view options, receive the user selection of the alternative view from the plurality of view options, and receive a user input of the at least one decryption password.

8. The method of claim 1, further comprising:
enabling display of the subset of fragments in at least two distinct alternative views selected from the plurality of view options.

9. The method of claim 1, further comprising:
receiving a user input of the at least one decryption password.

10. The method of claim 1, further comprising:
receiving a user selection of the subset of fragments from the document.

11. A computer system, comprising:
one or more processors; and
memory having instructions stored thereon, which when executed by the one or more processors cause the processors to perform operations comprising:
automatically detecting a plurality of fragments of a document for possible encryption without user intervention based on at least one of: content of each of the fragments and the context of each of the fragments within the document;
encrypting a subset of fragments using at least one decryption password required for decrypting and visualizing original content of the subset of fragments;
enabling a plurality of view options for viewing the subset of fragments;
in response to receiving a user selection of an alternative view from the plurality of view options, providing the alternative view of the subset of fragments that prevents viewing and access of content corresponding to the subset of fragments; and in accordance with a determination that the at least one decryption password is provided, displaying the subset of fragments without encryption temporarily until another document is selected for display.

12. The computer system of claim 11, wherein the plurality of fragments includes at least one of: a number or alphanumeric sequence longer than a predetermined length, credential information, a name of a financial or security organization, a content indication term signifying a predetermined type of content, and a user-defined sensitive term.

13. The computer system of claim 12, wherein the credential information includes at least one of: password, passcode, credentials, user name, account, ID, login, confidential, and sensitive.

14. The computer system of claim 12, wherein the set of indication terms include at least one of: formula, figure, and chart.

15. The computer system of claim 14, memory having instructions stored thereon for performing operations further comprising:
in response to detection of a first indication term signifying an image, identifying the image that follows the first indication term for encryption.

16. A non-transitory computer-readable medium, having instructions stored thereon, which when executed by one or more processors cause the processors to perform operations comprising:
automatically detecting a plurality of fragments of a document for possible encryption without user intervention based on at least one of: content of each of the fragments and the context of each of the fragments within the document;
encrypting a subset of fragments using at least one decryption password required for decrypting and visualizing original content of the subset of fragments;
enabling a plurality of view options for viewing the subset of fragments;
in response to receiving a user selection of an alternative view from the plurality of view options, providing the alternative view of the subset of fragments that prevents viewing and access of content corresponding to the subset of fragments; and
in accordance with a determination that the at least one decryption password is provided, displaying the subset of fragments without encryption temporarily until another document is selected for display.

17. The non-transitory computer-readable medium of claim 16, wherein the subset of fragments is located at two distinct portions of the document, each portion having a distinct decryption password, and each fragment is encrypted using the distinct decryption password of a corresponding one of the two distinct portions at which the respective fragment is located.

18. The non-transitory computer-readable medium of claim 16, wherein the performed opeartions are implemented by a content management system, and the document includes a note in the content management system.

19. The non-transitory computer-readable medium of claim 18, wherein the content management system is cloud based, and shares content across a plurality of client devices of a user.

20. The non-transitory computer-readable medium of claim 16, wherein the alternative view is provided on a mobile device, and the mobile device is one of a mobile phone, a tablet and a laptop computer.

* * * * *